(12) United States Patent
Ambrozy et al.

(10) Patent No.: US 7,940,605 B2
(45) Date of Patent: May 10, 2011

(54) STIMULUS INDICATING DEVICE EMPLOYING POLYMER GELS

(75) Inventors: Rel S. Ambrozy, Arlington, VA (US);
Jade Litcher, Raleigh, NC (US);
Raymond C. Jones, Leesburg, VA (US)

(73) Assignee: Prasidiux, LLC, Arlington, VA (US)

(*) Notice: Subject to any disclaimer, the term of this patent is extended or adjusted under 35 U.S.C. 154(b) by 96 days.

(21) Appl. No.: 11/486,969

(22) Filed: Jul. 14, 2006

(65) Prior Publication Data

US 2007/0036038 A1   Feb. 15, 2007

Related U.S. Application Data

(63) Continuation-in-part of application No. 11/414,254, filed on May 1, 2006.

(60) Provisional application No. 11/414,254, filed on May 1, 2006, provisional application No. 60/698,984, filed on Jul. 14, 2005, provisional application No. 60/675,882, filed on Apr. 29, 2005.

(51) Int. Cl.
*G04F 1/00* (2006.01)
(52) U.S. Cl. .................... 368/327; 116/200
(58) Field of Classification Search .......... 368/327; 116/200
See application file for complete search history.

(56) References Cited

U.S. PATENT DOCUMENTS

| | | | |
|---|---|---|---|
| 2,850,393 A | 9/1958 | Romito | |
| RE25,499 E | 12/1963 | Fenity et al. | |
| 3,615,719 A | 10/1971 | Michel | |
| 3,665,770 A | 5/1972 | Sagi et al. | |
| 3,695,903 A | 10/1972 | Telkes et al. | |
| 3,888,631 A | 6/1975 | Sturzinger | |
| 3,922,917 A | 12/1975 | Ayres | |
| 3,954,011 A | 5/1976 | Manske | |
| 3,962,920 A | 6/1976 | Manske | |
| 3,967,579 A | 7/1976 | Seiter | |
| 3,999,946 A | 12/1976 | Patel et al. | |
| 4,064,827 A | 12/1977 | Darringer et al. | |
| 4,118,370 A | 10/1978 | Sannes et al. | |
| 4,148,748 A | 4/1979 | Hanlon et al. | |
| 4,175,207 A | 11/1979 | Elliott | |
| 4,280,361 A | 7/1981 | Sala | |
| 4,327,117 A | 4/1982 | Lenack et al. | |
| 4,439,346 A | 3/1984 | Patel et al. | |
| 4,588,491 A | 5/1986 | Kreisher et al. | |
| 4,601,588 A | 7/1986 | Takahara et al. | |
| 4,657,409 A | 4/1987 | Wiggin et al. | |

(Continued)

FOREIGN PATENT DOCUMENTS

GB      1212859       11/1970

(Continued)

OTHER PUBLICATIONS

*VITSAB®: A Technical Short Course.* Available from website, 1998. Vitsab Indicator marketing information.

(Continued)

*Primary Examiner* — Edwin A. Leon
(74) *Attorney, Agent, or Firm* — Dewey & LeBoeuf LLP; Jeff E. Schwartz

(57) ABSTRACT

The present invention relates to a stimulus-indicating device. More particularly, the present invention relates to an apparatus and method for evidencing when a product has been exposed to a designated stimulus for a certain period of time.

14 Claims, 2 Drawing Sheets

U.S. PATENT DOCUMENTS

| | | | |
|---|---|---|---|
| 4,732,930 | A | 3/1988 | Tanaka et al. |
| 4,737,463 | A | 4/1988 | Bhattacharjee et al. |
| 4,812,053 | A | 3/1989 | Bhattacharjee |
| 4,892,677 | A | 1/1990 | Preziosi et al. |
| 4,917,503 | A | 4/1990 | Bhattacharjee |
| 4,925,314 | A | 5/1990 | Claudy et al. |
| 5,000,579 | A | 3/1991 | Kumada et al. |
| 5,053,339 | A | 10/1991 | Patel |
| 5,057,434 | A | 10/1991 | Prusik et al. |
| 5,076,197 | A | 12/1991 | Darringer et al. |
| 5,077,033 | A | 12/1991 | Viegas et al. |
| 5,085,802 | A | 2/1992 | Jalinski |
| 5,100,933 | A | 3/1992 | Tanaka et al. |
| 5,153,036 | A | 10/1992 | Sugisawa et al. |
| 5,198,148 | A | 3/1993 | Nakano |
| 5,242,491 | A | 9/1993 | Mamada et al. |
| 5,267,794 | A | 12/1993 | Holzer |
| 5,274,018 | A | 12/1993 | Tanaka et al. |
| 5,281,570 | A | 1/1994 | Hasegawa et al. |
| 5,336,057 | A | 8/1994 | Fukuda et al. |
| 5,348,813 | A | 9/1994 | Bohmer et al. |
| 5,360,682 | A | 11/1994 | Bohmer |
| 5,403,893 | A | 4/1995 | Tanaka et al. |
| 5,404,834 | A | 4/1995 | Murphy |
| RE35,068 | E | 10/1995 | Tanaka et al. |
| 5,476,792 | A | 12/1995 | Ezrielev et al. |
| 5,580,929 | A | 12/1996 | Tanaka et al. |
| 5,602,804 | A | 2/1997 | Haas |
| 5,622,137 | A | 4/1997 | Lupton, Jr. et al. |
| 5,630,372 | A | 5/1997 | Ramsey et al. |
| 5,633,835 | A | 5/1997 | Haas et al. |
| 5,667,303 | A | 9/1997 | Arens et al. |
| 5,694,806 | A | 12/1997 | Martin et al. |
| 5,709,472 | A | 1/1998 | Prusik et al. |
| 5,922,186 | A | 7/1999 | Shukla et al. |
| 5,964,181 | A | 10/1999 | Pereyra et al. |
| 5,997,927 | A | 12/1999 | Gics |
| 6,030,442 | A | 2/2000 | Kabra et al. |
| 6,143,138 | A | 11/2000 | Becker |
| 6,180,288 | B1 | 1/2001 | Everhart et al. |
| 6,214,623 | B1 | 4/2001 | Simons et al. |
| 6,231,229 | B1 | 5/2001 | Halderman |
| 6,244,208 | B1 | 6/2001 | Qiu et al. |
| 6,295,167 | B1 | 9/2001 | Uematsu et al. |
| 6,399,387 | B1 | 6/2002 | Stenholm et al. |
| 6,435,128 | B2 | 8/2002 | Qiu et al. |
| 6,472,214 | B2 | 10/2002 | Patel |
| 6,570,053 | B2 | 5/2003 | Roe et al. |
| 6,593,588 | B1 | 7/2003 | Reimer |
| 6,614,728 | B2 | 9/2003 | Spevacek |
| 6,694,913 | B2 | 2/2004 | Cooperman |
| 6,741,523 | B1 * | 5/2004 | Bommarito et al. .......... 368/327 |
| 6,773,637 | B1 | 8/2004 | DiSalvo et al. |
| 6,782,909 | B1 | 8/2004 | Ragless |
| 6,863,437 | B2 | 3/2005 | Ohnishi et al. |
| 6,863,859 | B2 | 3/2005 | Levy |
| 6,916,116 | B2 * | 7/2005 | Diekmann et al. ............ 374/102 |
| 6,968,804 | B1 | 11/2005 | Barbieri et al. |
| 7,313,917 | B2 | 1/2008 | Yeghiazarian et al. |
| 7,314,584 | B2 | 1/2008 | Tsutsui et al. |
| 7,435,479 | B2 | 10/2008 | Tsutsui et al. |
| 2002/0031841 | A1 | 3/2002 | Asher et al. |
| 2002/0068019 | A1 | 6/2002 | Fujiwara et al. |
| 2003/0053377 | A1 * | 3/2003 | Spevacek ...................... 368/327 |
| 2003/0207466 | A1 | 11/2003 | Lee |
| 2004/0171740 | A1 | 9/2004 | Ruberti et al. |
| 2006/0262828 | A1 | 11/2006 | Ambrozy et al. |
| 2007/0195652 | A1 | 8/2007 | Ambrozy et al. |

FOREIGN PATENT DOCUMENTS

| | | |
|---|---|---|
| GB | 2397022 A | 7/2004 |
| JP | 2004301529 A | 10/2004 |
| JP | 2004301530 A | 10/2004 |
| JP | 2005003616 A | 1/2005 |
| WO | WO-87/02163 | 4/1987 |
| WO | WO 92/02005 A2 | 2/1992 |
| WO | WO 0129525 A1 | 4/2001 |
| WO | WO 2004/062699 | 7/2004 |

OTHER PUBLICATIONS

VITSAB® *The sign of freshness. Time Temperature Indicator Tags—The Key To Consumer Involvement In Food Safety and Quality*. Telatemp. Vitsab Indicator marketing information. 1997. Accessed: Jan. 15, 1998.

*VITSAB® TTI Frequently Asked Questions*. Telatemp. Vitsab Indicator marketing information. 1997. Accessed: Oct. 17, 1998.

*TTI Indicators—The Time Has Come*. Telatemp. Vitsab Indicator marketing information. 1997. Accessed: Oct. 17, 1998.

*VITSAB® Freeze Temperature Checkers*. Vitsab Indicator marketing information. Telatemp. 1997. Accessed: Oct. 17, 1998.

*Temperature Labels*. Telatemp. Telatemp marketing information. 1993. Accessed: Oct. 17, 1998.

LifeLines Indicator Marketing information. LifeLines Technology. Oct. 27, 1998.

*Hallcrest: Leading the Way in Temperature-Indicating Technology*. Hallcrest, Inc. Hallcrest Indicator Marketing information. 1997. Accessed: Oct. 17, 1998.

*3M Monitor Mark: High Temperature and Customer Activated Threshold Indicators*. 3M. 3M Indicator Marketing information. 1997. Accessed: Oct. 17, 1998.

*Tempil Temperature Indicators*. Tempil, Inc. Tempil Indicator Marketing information. 1996.

*Measure-Tech Australia: Innovations in Measuring Technology*. Measure-Tech Indicator Marketing information. Measure-Tech Australia Pty Ltd. 1997. Accessed: Oct. 17, 1998.

TempTales3®. Sensitech, Inc. TempTales Indicator Marketing information. 1996-1997. Accessed: Oct. 17, 1998.

*IceWatch*. IceWatch Indicator Marketing information. Timeticket. 1997. Accessed: Oct. 17, 1998.

Marianne E. Harmon, Mary Tang, Curtis W. Frank; A Microfludic Actuator Based On Thermoresponsive Hydrogels; Polymer; vol. 44 (2003) 4547-4556; Elsevier Science Inc.; USA.

Stevin H. Gehrke, Julie Robeson; James Fred Johnson, and Nitin Vaid; Protein Isolation by Solution-Controlled Gel Sorption; Biotechnol. Prog.; vol. 7; No. 4 (1991); 355-358; American Chemical Society and American institute of Chemical Engineers; USA.

Bhagwati G. Kabra, Stevin H. Gehrke, and Richard J. Spontak; Microporous, Responsive Hydroxypropyl Cellulose Gels 1. Synthesis and Microstructure; Macromolecules; vol. 31; No. 7; (1998); 2166-2173; American Chemical Society; USA.

Seiji Katayama; Chemical Condition Responsible for Thermoswelling or Thermoshrinking Type of Volume Phase Transition in Gels—Effect of Relative Amounts of Hydrophobic to Hydrophilic Groups in the Side Chain; Journal Physical Chemistry; vol. 96; No. 13 (1992); 5209-5210; American Chemical Society; USA.

M.R. Guilherme, R. Silva, E.M. Girotto, A.F. Rubira, E.C. Muniz; Hydrogels Based On PAAm Network With PNIPAAm Included: Hydrophilic—Hydrophobic Transition Measured By The Partition of Orange II and Methylene Blue In Water; Polymer; 44 (2003); 4213-4219; Elsevier Science Ltd.

Tae Gwan Park, Allan S. Hoffman; Sodium Chloride-Induced Phase Transition in Nonionic Poly(N-isopropylacrylamide) Gel; Macromolecules vol. 26; No. 19; (1993); 5045-5048; American Chemical Society; USA.

Yoshitsugu Hirokawa and Toyoichi Tanaka; Volume Phase Transition In A Nonionic Gel; Journal Chemical Physics; vol. 81, No. 12, Pt. 11; (1984); 6379-6380; American Institute of Physics; USA.

Toyoichi Tanaka; Gels; Scientific American; vol. 244; No. 1; (1981); pp. 124-138; USA.

Shunsuke Hirotsu, Yoshitsugu Hirokawa, and Toyoichi Tanaka; Volume-Phase Transitions of Ionized N-isopropylacrylamide Gels; Journal of Chemical Physics; vol. 87, No. 2 (1987); 1392-1395; The American Institute of Physics; USA.

Akira Mamda, Toyoichi Tanaka, Dawan Kungwatchakun, and Masahiro Irie; Photoinduced Phase Transition of Gels; Macromolecules; vol. 23; No. 5 (1990); 1517-1519; American Chemical Society; USA.

Etsuo Kokufuta and Toyoichi Tanaka; Biochemically Controlled Thermal Phase Transition Gels; Macromolecules; vol. 24; No. 7 (1991); 1605-1607; American Chemical Society; USA.

Yanhie Zhang, Steven Furyk, David E. Bergbreiter and Paul S. Cremer; Specific Ion Effects On The Water Solubility Of Macromolecules: PNIPPAm and Hofmeister Series; Journal Of The American Chemical Society; vol. 127; No. 41; (2005); pp. 14505-14510; USA.

Franck Ilmain, Toyoichi Tanaka & Etsuo Kokufuta; Volume Transition in a Gel Driven By Hydrogen Bonding; Nature; vol. 349; (Jan. 1991); 400-401; USA.

Toyoichi Tanaka, David Fillmore, Shao-Tang Sun, Izumi Nishio, Gerald Swislow and Arati Shah; Phase Transitions in Ionic Gels; Physical Review Letters; vol. 45, No. 20; (1980); 1636-1639; The American Physical Society; USA.

Toyoichi Tanaka, David J. Filmore; Kinetics Of Swelling Of Gels; Journal Of Chemical Physics; vol. 70; No. 3; (1979); pp. 1214-1218; American Institute of Physics; USA.

PCT/US06/27564 International Search Report, Apr. 27, 2007.
PCT/US06/16521 International Search Report, Jan. 30, 2007.
PCT/US06/39874 International Search Report, Sep. 13, 2007.
Abandoned U.S. Appl. No. 08/636,133; filed Apr. 22, 1996; first named inventor was Litcher (application not included).
Information Disclosure Statement For U.S. Appl. No. 08/636,133 dated Jun. 16, 1997.
Notice Of References Cited For U.S. Appl. No. 08/636,133 dated Jun. 16, 1997.
Information Disclosure Statement For U.S. Appl. No. 08/636,133 dated Aug. 2, 1999.
Notice Of References Cited For U.S. Appl. No. 08/636,133 dated Aug. 22, 1999.
PCT/US07/87080 International Search Report, Jun. 26, 2008.
PCT/US08/55880 International Search Report, Aug. 29, 2008.
Office Action For U.S. Appl. No. 11/954,520 Mailed Dec. 30, 2009.
Office Action For U.S. Appl. No. 11/580,241 Mailed Mar. 5, 2008.
Sep. 4, 2008 Reply To Office Action For U.S. Appl. No. 11/580,241.
Office Action For U.S. Appl. No. 11/580,241 Mailed Nov. 19, 2009.
Office Action For U.S. Appl. No. 11/414,254 Mailed Apr. 28, 2009.
Oct. 28, 2008 Reply To Office Action For U.S. Appl. No. 11/414,254.
Office Action For U.S. Appl. No. 11/414,254 Mailed Feb. 2, 2010.
Office Action for U.S. Appl. No. 11/414,254 (Mailed Feb. 2, 2010).
Reply to OA For U.S. Appl. No. 11/414,254 (Mailed Jul. 2, 2010).
Office Action For U.S. Appl. No. 11/954,520 (Mailed Dec. 30, 2009).
Reply to OA For U.S. Appl. No. 11/954,520 (Mailed Jun. 30, 2010).
Office Action For U.S. Appl. No. 11/580,241 (Mailed Nov. 19, 2009).
Reply to OA For U.S. Appl. No. 11/580,241 (Mailed Apr. 19, 2010).
Final Office Action dated Sep. 14, 2010, in U.S. Appl. No. 11/954,520.
Non-Final Office Action dated Aug. 6, 2010, in U.S. Appl. No. 12/042,528.

* cited by examiner

US 7,940,605 B2

STIMULUS INDICATING DEVICE EMPLOYING POLYMER GELS

CROSS REFERENCE TO RELATED APPLICATIONS

The subject matter of this application is related to, and claims the benefit under 35 U.S.C. § 119 of, U.S. Provisional Patent Application Ser. No. 60/698,984, filed Jul. 14, 2005; and is a continuation-in-part of, and claims the benefit under 35 U.S.C. § 120 of, U.S. patent application Ser. No. 11/441, 254, filed May 1, 2006, entitled "Stimulus Indicating Device Employing Polymer Gels," which is related to, and claims the benefit under 35 U.S.C. § 119 of, U.S. Provisional Patent Application No. 60/675,882, filed Apr. 29, 2005, which are all hereby incorporated by reference in their entirety.

FIELD OF THE INVENTION

The present invention relates to a stimulus-indicating device. More particularly, the present invention relates to an apparatus and method for evidencing when a product has been exposed to a designated stimulus for a certain period of time.

RELATED PRIOR ART

It is well known in the art that the useful life of a perishable product is a function of its cumulative exposure to a harmful stimulus over a period of time. The types of stimuli that advance the degradation of stimulus-sensitive products over time include not only temperature, but also light, pH, humidity, electromagnetic radiation and radiation. The useful life of a temperature sensitive product is a function of its cumulative time-temperature exposure—a combination of the temperature to which a product is exposed and the duration of the exposure.

For stimulus sensitive products, degradation generally occurs faster at a higher stimulus (i.e., temperature) than at lower stimulus (i.e., temperature). For example, often a temperature-perishable product will typically have a longer useful life if it is exposed to lower temperatures than if it is exposed to higher temperatures. However, this is not always the case because certain stimulus sensitive products will degrade sooner at a lower stimulus (especially freezing temperatures) than at a higher stimulus. For example, a malaria vaccine will degrade faster below 2° C. than if stored between the range of 3° C. to 7° C. Thus the rate of degradation is often stimulus and product specific.

Stimulus perishable products susceptible to degradation due to cumulative time-stimulus exposure include, but are not limited to, food, food additives, chemicals, biological materials, drugs, cosmetics, photographic supplies and vaccines. Many manufacturers mark their products with printed expiration dates in an attempt to provide an indication of when the useful life of a perishable product lapses. However, these dates are only estimates and may be unreliable because they are based on assumptions about the stimulus history of the product that may not be true with respect to the particular unit or product in the package on which the expiration date appears. Specifically, manufacturers compute expiration dates by assuming that the product will be kept within a specified stimulus range during the product's useful life. However, the manufacturer cannot always predict or control the stimulus exposure of a product through each step of the supply chain that delivers the product to the consumer. If the product is actually exposed to stimulus higher than those on which the expiration date is based, the perishable product may degrade or spoil before the printed expiration date. When this happens, the expiration date may mislead the consumer into believing that the perishable product is still usable when, in fact, its useful life has lapsed.

Marking a stimulus sensitive product with an expiration date is useful nonetheless, because often a visual inspection of the perishable product does not warn a potential user that the exposure of the product to a harmful stimulus has caused it to degrade or spoil. Although there are certain time-stimulus indicators currently available, most are focused on temperature, and not on the other types of stimuli. Additionally, many of these time-temperature indicators require the active agents to be kept separate from one another until the indicator is attached to the product it is monitoring. If the active ingredients are not kept separate they will begin to interact prematurely, thereby giving a premature indication of spoilage. As a result, these types of indicators require manual activation, but manual activation is not always feasible when the indicator is being used with a product that is mass-produced in high-volume.

Thus, there is a need for an indicator that indicates when a stimulus sensitive product has been exposed to a deleterious stimulus extreme for a pre-determined amount of time. There is also a need for a time-stimulus indicator that does not contain active agents that will begin to interact prior to being attached to the product being monitored, thereby resulting in false indications of spoilage. Furthermore, there is a need for a stimulus indicator that does not require manual activation, and a stimulus indicator that can provide an irreversible indication of exposure to a predetermined stimulus extreme.

SUMMARY OF THE INVENTION

The present invention is directed to a stimulus indicator device, which substantially overcomes one or more of the above-mentioned problems arising from limitations and disadvantages of the related art.

To achieve these and other advantages and in accordance with the purpose of the invention, as embodied and broadly described, one embodiment of the invention is a device including a first compartment and a second compartment separated by a semi-permeable membrane, with the first compartment containing a stimulus sensitive gel. A display portion is provided through which a color change can be seen when the stimulus sensitive gel changes volume by shrinking in reaction to a predetermined stimulus. As the gel shrinks in response to the predetermined stimulus, a liquid within the stimulus sensitive gel is expelled in the first compartment, and passes into the second compartment though the semi-permeable membrane that separates the two compartments. Because the semi-permeable membrane only allows the liquid to pass in one direction, the liquid is trapped in the second compartment, resulting in a constant volume of liquid and gel in the first compartment and thereby preventing the gel from re-expanding even when the predetermined stimulus condition is removed.

In accordance with the purpose of the invention, as embodied and broadly described, another embodiment of the invention is a device that indicates when a stimulus sensitive product has potentially or conclusively undergone a physical change in response to exposure to a predetermined stimulus extreme.

In accordance with the purpose of the invention, as embodied and broadly described, another embodiment of the invention is a device that indicates when a stimulus sensitive product has potentially or conclusively undergone a physical change in response to exposure to a predetermined stimulus extreme over a predetermined period of time.

It is to be understood that both the foregoing general description and the following detailed description are exemplary and explanatory and are intended to provide further explanation of the invention as claimed.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF EMBODIMENTS OF THE INVENTION

Figures 1A, 1B:
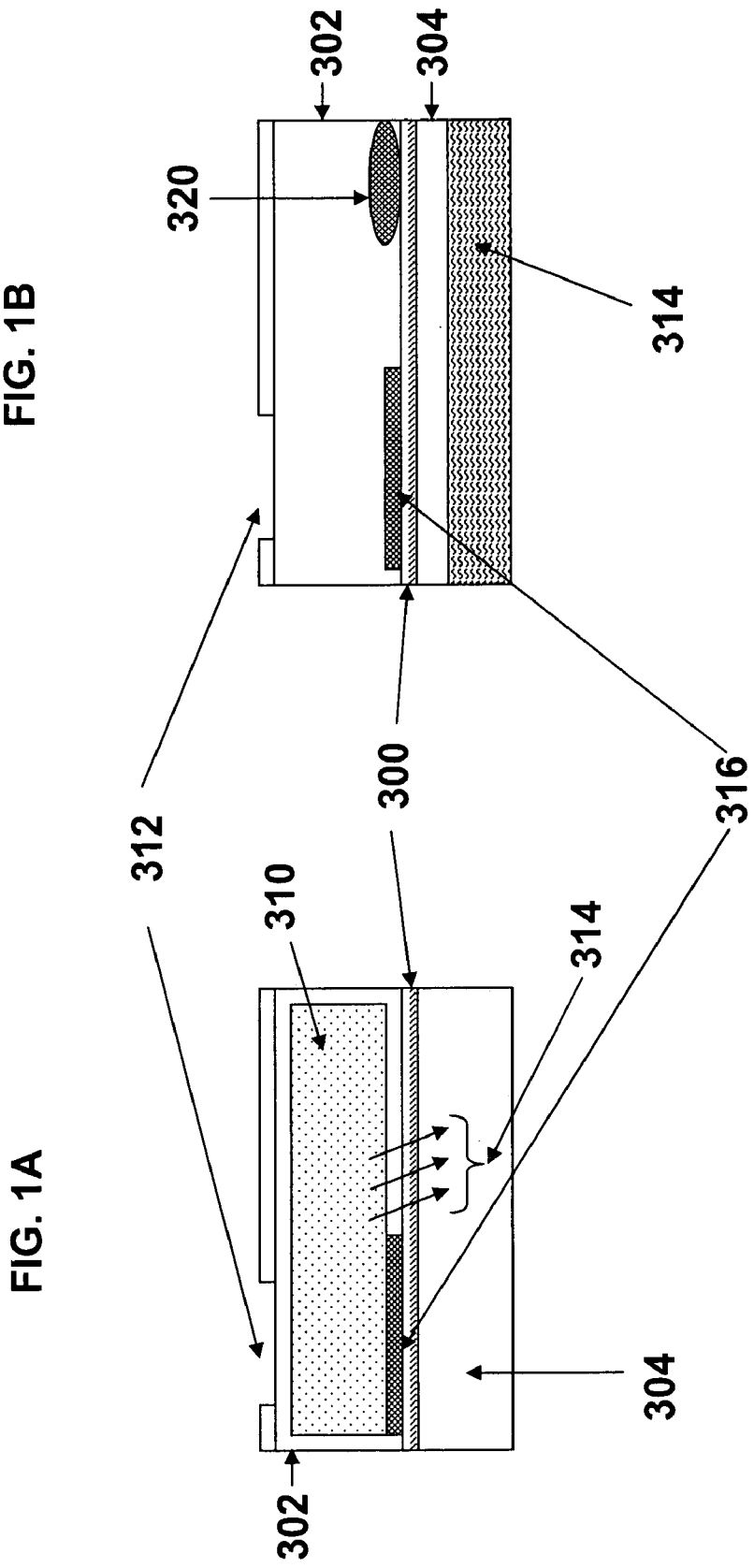
FIG. 1A is a side cross-sectional view of an embodiment of the invention before exposure to a predetermined stimulus extreme.
FIG. 1B is a side cross-sectional view of the embodiment in FIG. 1A after exposure to a predetermined stimulus extreme.

Referring now to the drawings, and more specifically to the embodiment shown in FIG. 1A and FIG. 1B, it is well known that the swelling of polymer gels is dictated by equilibrium thermodynamics, and therefore, a shrunken gel will swell back to its original volume if exposed to its original temperature, for example. Accordingly, it is necessary to develop indicating devices with irreversibility built into the stimulus-sensitive operation of the indicator.

Disclosed herein are three broad embodiments to ensure an irreversible, reliable visual indication of temperature transition in the temperature indicator. The same embodiments could be used for other stimuli such as humidity, radiation, visible light, etc. For ease of discussion we will focus on exposure to a pre-determined temperature stimulus. The three broad areas include: i) the use of semi-permeable membranes; ii) physical constriction of the gels; and iii) the use of dyes. These embodiments may be used alone or in combination.

The first embodiment, as shown in FIGS. 1A and 1B, utilizes a semi-permeable membrane barrier that separates the expelled water from the gel as the swollen gel shrinks. Such a membrane would prevent the shrunken gel from later reacting with the expelled water, thus preventing expansion of the gel back to its original size.

As shown in FIG. 1A, a semi-permeable membrane 300 separates two adjacent compartments, first compartment 302 and second compartment 304. In first compartment 302, a portion of swollen gel 310 is visible in the indicator window 312, with the remaining portion being hidden from view. The swollen gel 310 may be based on polyacrylic acid (PAA), polyacrylamide (PAAm), and its variations such as n-isopropylacrylamide (NIPAAm), and their derivatives. These polymer gels undergo a significant change in volume in response to a range of stimuli, including temperature, solvent composition, pH, ionic strength etc. As described in U.S. Pat. No. 5,100,933, the "trigger" temperature at which a gel changes volume can be "tuned" to a particular value by adding salts, surfactants, or other substances to the gel matrix.

A further concept inherent in these polymer gels is the directionality of the temperature-induced volume changes. Some polymer gels (e.g., PAAm) shrink when cooled below a trigger temperature; they are said to have an "Upper Critical Solution Temperature" or UCST. However, there are other polymer gels (e.g., NIPAAm) that shrink when heated above a trigger temperature. The latter polymers are said to show a "Lower Critical Solution Temperature" or LCST. UCST or LCST behavior depends on the chemical structure. Many examples of both kinds of polymer are known in the literature.

The swollen gel 310 may contain a suitable dye or additive to color the gel, for example, green. The net result is to enable the green color to be exposed through the indicator window 312 so long as the perishable product stayed within safe limits. When the temperature sensitive product is exposed to the transition temperature, the swollen gel 310 will shrink (see reference numeral 320 in FIG. 1B) and not be visible through the indicator window 312. The transition temperature trigger may be when the gel is heated or cooled to a designated temperature, depending on whether the polymer gel was of the LCST or UCST type. In either case, as the swollen gel 310 shrinks, the water (or other liquid or mixture) 314 in the gel matrix is expelled. Accordingly, as shown in FIG. 1A the expelled water 314 would pass through the semi-permeable membrane 300 and be deposited in the empty second compartment 304. The shrinking of the gel exposes the colored indicator spot 316 through the indicator window 312 (which would now present a red color, for example), indicating a harmful temperature exposure as shown in FIG. 1B.

Referring again to FIG. 1B above, the shrunken gel 320 would remain in that state, even if the temperature returns to the "good" range, because the shrunken gel 320 could not come into contact with the expelled water 314 to expand back to its original state. Because the semi-permeable membrane 300 only allows the liquid to pass in one direction, the liquid is trapped in the second compartment 304, resulting in a constant volume of liquid and gel in the first compartment 302 and thereby preventing the gel from re-expanding even when the predetermined stimulus condition is removed. Preferably the gel is held in place in the first compartment 302 by being attached at a point opposite the indicator window 312.

A suitable water-absorbing (hygroscopic) substance, such as a silica gel, could also be added to the empty second compartment 304 to ensure the expelled water 314 is used up and not be allowed to pass back through the semi-permeable or permeable membrane to allow the gel to expand. In an alternate embodiment, as the swollen gel 310 shrinks and expels the water 314, it could also expel a dye that discolors a gauze or litmus-type substrate, as opposed to having a pre-existing indicator spot 316. Therefore, even without a semi-permeable membrane 300, if the shrunken gel 320 expanded back to its original size, the discolored gauze-type substrate would produce a different visual color as viewed through the indicator window 312, thereby confirming exposure to a harmful temperature. The dye could be used either with or without the membrane.

U.S. Provisional Patent Application No. 60/675,882 described several embodiments in which each gel was housed in a plastic casing or compartment that provided rigid constraining walls, and a variety of physically constricting compartment shapes, for example, with neck portions, to ensure that once a gel shrinks, it cannot swell back to fill the indicator window.

It is believed that certain contours, similar to nozzle shapes as shown in FIG. 2, will allow relatively unrestricted flow of a swollen gel as it shrinks, but will greatly restrict the flow of the then-shrunken gel as it tries to expand, thereby ensuring an irreversible indication.

Figure 2B:
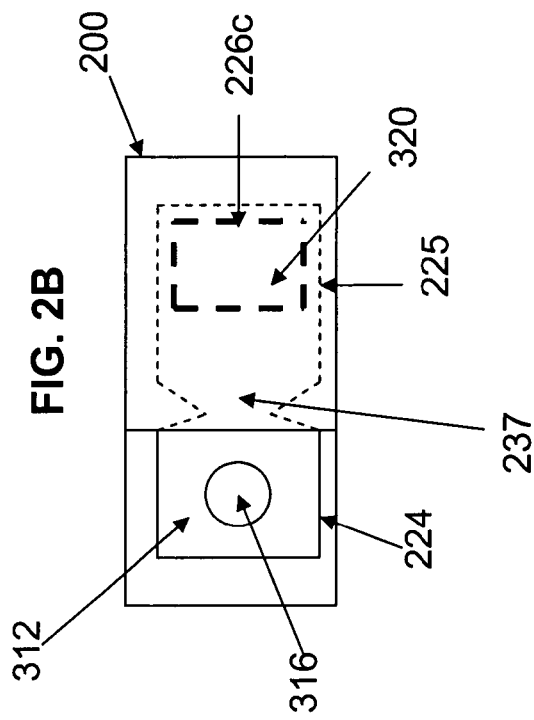
FIG. 2B is a top view of a stimulus-indicating device with two compartments connected by a nozzle portion and the stimulus-indicating gel in the contracted stimulated state.
Figure 2A:
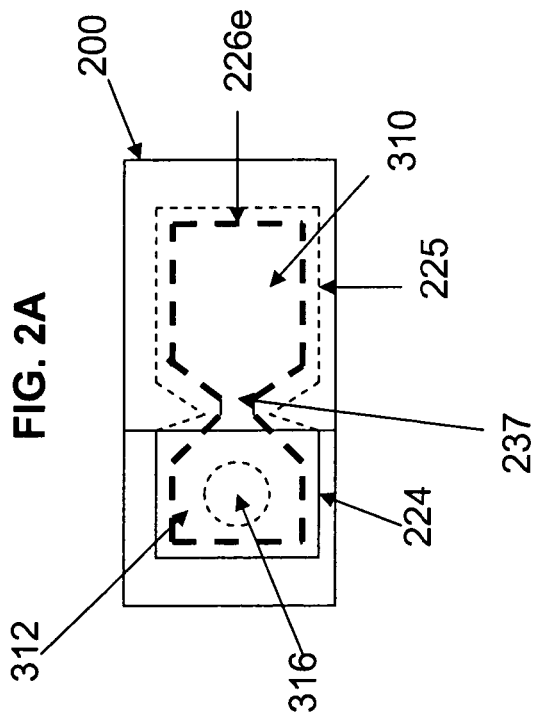
FIG. 2A is a top view of a stimulus-indicating device with two compartments connected by a nozzle portion and the stimulus-indicating gel in the expanded non-stimulated state.

FIGS. 2A and 2B provide a top-down view of stimulus-indicating device 200. This embodiment of the stimulus sensitive device 200 consists of a first compartment 224 and a second compartment 225. The first compartment 224 and the second compartment 225 are additionally formed and differentiated from one another by a nozzle portion 237. What is important is that the water or other suitable liquid 314 described above that interacts with the swollen gel 310 flow freely between the first compartment 224 and the second compartment 225 through the nozzle portion 237, while the nozzle portion 237 provides a constricting region to any subsequent attempt by the shrunken gel 320 to expand back into the first compartment 224.

In this embodiment, the indicator spot 316 that is contained in the first compartment 224 is colored a first color, such as red. As shown in FIG. 2A, when the swollen gel 310 in this embodiment has not been exposed to a stimulus extreme, such as temperature, the swollen gel 310 is in its expanded state (contour shown by heavy dashed-lines 226e) and resides in both the first compartment 224 and the second compartment 225. Thus, prior to being exposed to a critical temperature extreme the swollen gel 310 completely covers the indicator spot 316 positioned inside the first compartment 224. The swollen gel 310 that in its expanded state 226e is present in both the first compartment 224 and the second compartment 225 is designed to be sensitive to a stimulus, and reacts to such stimulus by undergoing a noticeable decrease in volume. In other words, when the swollen gel 310 is exposed to a predetermined stimulus, it shrinks in volume, and therefore shrinks in size. Although the decrease in volume of the gel in this embodiment can be by any amount so long as it is noticeable, preferably the decrease in volume of the swollen gel 310 in this embodiment is between at least a 1/10 reduction in original volume up to 500 times decrease in original volume.

By way of example only, the gel 310 which changes volume when it is exposed to a predetermined stimulus can be manufactured as described in at least the following references: U.S. Pat. Nos. RE35,068, 5,403,893 and 4,732,930 to Tanaka et al. See also, Harmon et al., "A microfluidic actuator based on thermoresponsive hydrogels", Polymer 44 (2003) at 4547-4556. By manufacturing the gel 310 in the manner described in any of those references, the gel 310 will remain stable at its manufactured volume until it is exposed to the predetermined stimulus. As disclosed in these references, the gel 310 is designed to work in conjunction with water or other suitable liquid 314 that aids in its volume change. In this embodiment the first compartment 224 and the second compartment 225 are interconnected so that the liquid 314 flows freely between the first compartment 224 and the second compartment 225.

As shown in FIG. 2B, once the swollen gel 310 had been exposed to the predetermined stimulus extreme for a predetermined amount of time, the shrunken gel 320 will have collapsed (contour shown by heavy dashed-lines 226c) to a point where the second color of the swollen gel 310 is no longer visible because it has receded from the indicator window 312 positioned above the first compartment 224. At this point the first color (e.g., red) of the indicator spot 316 in the first compartment 224 is visible to the user through the indicator window 312. It is the appearance of this second color in the indicator window 312 that indicates to the user that the stimulus sensitive product to which the stimulus-indicating device 200 is attached, has been exposed to a deleterious stimulus extreme, and has either probably or definitely spoiled. Preferably the shrunken gel 320 is held in place in the second compartment 225 by being attached at a point opposite the indicator window 312.

Although the invention has been particularly shown and described with reference to preferred embodiments thereof, it will be understood by those skilled in the art that various changes in form and detail may be made to it without departing from the spirit and scope of the invention.

We claim:

1. A stimulus-indicating device comprising:
   a first compartment;
   a stimulus sensitive gel contained in said first compartment that is capable of shrinking in volume in response to exposure to a predetermined stimulus;
   a liquid contained in said stimulus sensitive gel that is capable of being expelled from said stimulus sensitive gel when said stimulus sensitive gel is exposed to a predetermined stimulus;
   a second compartment;
   a semi-permeable membrane separating said first compartment from said second compartment that is capable of allowing said liquid to pass from said first compartment to said second compartment, and that is capable of trapping said liquid in said second compartment; and
   a display portion positioned above said first compartment through which a color change can be seen in said first compartment when said stimulus sensitive gel changes volume by shrinking in reaction to a predetermined stimulus,
   whereby in response to exposure to a predetermined stimulus, said stimulus sensitive gel is capable of remaining permanently shrunken so as to permanently present said color change visible through said display portion and thereby permanently indicate exposure to a predetermined stimulus by expelling said liquid within said stimulus sensitive gel into said first compartment in response to a predetermined stimulus and said liquid passes through said semi-permeable membrane into said second compartment where said liquid is permanently trapped by said semi-permeable membrane so as to prevent said stimulus sensitive gel from reabsorbing said liquid and reversing said color change visible through said display portion.

2. The stimulus-indicating device of claim 1, further comprising:
   a liquid absorbing material in said second compartment to absorb said liquid expelled by said stimulus sensitive gel into said first compartment and that moved into said second compartment.

3. The stimulus-indicating device of claim 1, further comprising:
   an indicator spot located in said first compartment and positioned below said display portion
   wherein said indicator spot is covered by said stimulus sensitive gel when said stimulus sensitive gel is in its expanded state prior to its exposure to a predetermined stimulus, and
   wherein said stimulus sensitive gel is capable of permanently revealing said indicator spot so that said indicator spot is capable of being permanently viewed through said display portion after said stimulus sensitive gel shrinks in volume in response to being exposed to a predetermined stimulus.

4. The stimulus-indicating device of claim 1, further comprising:
   an indicator spot located in said first compartment and positioned below said display portion wherein said indicator spot is covered by said stimulus sensitive gel when said stimulus sensitive gel is in its expanded state prior to exposure to a predetermined stimulus, and wherein said stimulus sensitive gel is capable of permanently revealing said indicator spot so that said indicator spot is capable of being permanently viewed through said display portion after said stimulus sensitive gel shrinks in volume in response to being exposed to a predetermined stimulus for a predetermined period of time.

5. The stimulus-indicating device of claim 1, wherein said liquid that is expelled is water.

6. The stimulus-indicating device of claim 3, wherein said stimulus sensitive gel contains a dye that is a first color and said indicator spot is a second color.

7. The stimulus-indicating device of claim 3, wherein said stimulus sensitive gel is further capable of permanently revealing only a portion of said indicator spot.

8. The stimulus-indicating device of claim 3, wherein said stimulus sensitive gel is further capable of permanently revealing the entire said indicator spot.

9. The stimulus-indicating device of claim 3, wherein said stimulus sensitive gel is permanently affixed to said first compartment.

10. A stimulus indicating device that does not require manual activation and that is capable of providing permanent indication of exposure to a predetermined stimulus comprising:
a first compartment;
a stimulus sensitive gel contained in said first compartment that is capable of shrinking in volume in response to exposure to a predetermined stimulus;
a liquid contained in said stimulus sensitive gel that is capable of being expelled from said stimulus sensitive gel when said stimulus sensitive gel is exposed to a predetermined stimulus;
a second compartment;
a semi-permeable membrane separating said first compartment from said second compartment that is capable of allowing said liquid expelled from said stimulus sensitive gel to pass from said first compartment into said second compartment and that is capable of permanently trapping said liquid in said second compartment;
an indicator spot contained in said first compartment and positioned below and covered by said stimulus sensitive gel; and
an indicator window positioned above said first compartment and positioned above said indicator spot.

11. The stimulus indicating device of claim 10 wherein said stimulus sensitive gel is capable of permanently revealing said indicator spot so that said indicator spot is permanently visible through said indicator window due to said stimulus sensitive gel being capable of expelling said liquid and said stimulus sensitive gel being capable of shrinking in volume in response to exposure to a predetermined stimulus, and due to said semi-permeable membrane being capable of allowing said liquid to move into said second compartment and said semi-permeable membrane being capable of permanently trapping said liquid in said second compartment and thereby permanently preventing said stimulus sensitive gel from reabsorbing said liquid and expanding in volume and recovering said indicator spot.

12. The stimulus-indicating device of claim 10, wherein said stimulus sensitive gel is further capable of permanently revealing only a portion of said indicator spot.

13. The stimulus-indicating device of claim 10, wherein said stimulus sensitive gel is further capable of permanently revealing said indicator spot in its entirety.

14. The stimulus-indicating device of claim 10, wherein said stimulus sensitive gel is permanently affixed to said first compartment.

* * * * *